United States Patent
Walters et al.

(10) Patent No.: US 10,810,013 B2
(45) Date of Patent: Oct. 20, 2020

(54) MODIFYING BEHAVIOR OF A DATA PROCESSING UNIT USING REWRITABLE BEHAVIOR MAPPINGS OF INSTRUCTIONS

(71) Applicant: ARM Limited, Cambridge (GB)

(72) Inventors: Karel Hubertus Gerardus Walters, Cambridge (GB); Adam Raymond Duley, Austin, TX (US)

(73) Assignee: ARM Limited, Cambridge (GB)

(*) Notice: Subject to any disclaimer, the term of this patent is extended or adjusted under 35 U.S.C. 154(b) by 355 days.

(21) Appl. No.: 14/927,596

(22) Filed: Oct. 30, 2015

(65) Prior Publication Data

US 2017/0123803 A1    May 4, 2017

(51) Int. Cl.
| | | |
|---|---|---|
| *G06F 9/38* | (2018.01) | |
| *G06F 9/32* | (2018.01) | |
| *G06F 9/24* | (2006.01) | |
| *G06F 9/30* | (2018.01) | |
| *G06F 11/34* | (2006.01) | |

(52) U.S. Cl.
CPC .............. *G06F 9/3802* (2013.01); *G06F 9/24* (2013.01); *G06F 9/3016* (2013.01); *G06F 9/30181* (2013.01); *G06F 9/30185* (2013.01); *G06F 9/328* (2013.01); *G06F 9/3867* (2013.01); *G06F 9/30196* (2013.01); *G06F 11/348* (2013.01); *G06F 11/3466* (2013.01)

(58) Field of Classification Search
CPC .... G06F 9/3802; G06F 9/3016; G06F 9/3867; G06F 9/24; G06F 9/328; G06F 9/30185; G06F 11/348; G06F 11/3466
See application file for complete search history.

(56) References Cited

U.S. PATENT DOCUMENTS

| | | | |
|---|---|---|---|
| 5,983,337 A | | 11/1999 | Mahalingaiah et al. |
| 6,049,672 A | * | 4/2000 | Shiell .................. G06F 8/66 717/168 |
| 6,321,380 B1 | | 11/2001 | Derrick et al. |
| 6,530,076 B1 | * | 3/2003 | Ryan .................. G06F 11/28 712/227 |
| 6,631,463 B1 | | 10/2003 | Floyd et al. |
| 2005/0262307 A1 | * | 11/2005 | Chiang .................. G06F 8/70 711/137 |
| 2009/0210659 A1 | | 8/2009 | Carlough et al. |

(Continued)

OTHER PUBLICATIONS

UK Combined Search and Examination Report dated Nov. 24, 2016 in GB 1610011.7, 9 pages.

(Continued)

*Primary Examiner* — Aimee Li
*Assistant Examiner* — Courtney P Carmichael-Moody
(74) *Attorney, Agent, or Firm* — Nixon & Vanderhye P.C.

(57) ABSTRACT

An apparatus is provided comprising rewritable storage circuitry to store at least one mapping between at least one instruction identifier and a behaviour modification. Selection circuitry selects, from the rewritable storage circuitry, a selected mapping having an instruction identifier that identifies a received instruction. The received instruction causes a data processing unit to perform a default behaviour. Control circuitry causes the data processing unit to behave in accordance with the default behaviour modified by the behaviour modification.

18 Claims, 9 Drawing Sheets

(56) References Cited

U.S. PATENT DOCUMENTS

| | | | |
|---|---|---|---|
| 2011/0047423 A1* | 2/2011 | Bailey | G01R 31/31705 714/724 |
| 2011/0154107 A1* | 6/2011 | Alexander | G06F 9/30145 714/10 |
| 2011/0161640 A1* | 6/2011 | Knowles | G06F 9/30036 712/229 |
| 2012/0079458 A1* | 3/2012 | Williams | G06F 9/30189 717/124 |
| 2012/0151185 A1* | 6/2012 | Bybell | G06F 9/30076 712/205 |
| 2013/0097462 A1* | 4/2013 | Singh | G06F 11/25 714/39 |
| 2014/0143521 A1 | 5/2014 | Doing et al. | |
| 2014/0281402 A1* | 9/2014 | Comparan | G06F 9/30189 712/214 |

OTHER PUBLICATIONS

UK Examination Report dated Mar. 2, 2018 in GB 1610011.7, 4 pages.

\* cited by examiner

Figure 5C

| Input | | S | Output | | | T |
|---|---|---|---|---|---|---|
| Base | Mask | | New bits | Start | Length | |
| 0000 0000 0000 1011 | 0000 0000 0000 1111 | 0 | 0010 1110 | 11 | 8 | 1 |
| | | | 0110 | 216 | 4 | |

Figure 5D

| Input | | S | Output | |
|---|---|---|---|---|
| Base | Mask | | Replacement | Mask |
| 0000 0100 0000 0000 | 0000 1111 0000 0000 | 0 | 0101 0000 1110 0011 | 1111 0000 1111 1111 |

MODIFYING BEHAVIOR OF A DATA PROCESSING UNIT USING REWRITABLE BEHAVIOR MAPPINGS OF INSTRUCTIONS

BACKGROUND

The present disclosure relates to the field of modifying the behaviour of a data processing unit.

In a Data Processing Unit (DPU) comprising a pipeline, fetched instructions are decoded into one or more micro-operations (represented by a number of bits) and these micro-operations are then passed to one or more execution circuits. Sometimes, however, after the hardware has been built, there is found to be a design fault that causes execution to occur improperly for certain instructions or sequences of instructions. It has previously been proposed to deal with such problems by reprogramming the compiler. For example, in generating the assembly code, the compiler could avoid the generation of instructions or sequences of instructions that are known to cause problems. However, such an approach is extremely time-consuming and complicated, requiring a great deal of effort to implement. Additionally, such an approach does not entirely solve the underlying problem because code not compiled using the "new" compiler will still be subject to the fault. It would therefore be desirable to provide a mechanism in which it is possible to dynamically control the recognition of particular instructions or sequences of instructions and then either provide a signal indicating that the instructions or sequence instructions have been detected or else take particular action that can be used to inhibit improper execution of those instructions.

SUMMARY

Viewed from a first example configuration, there is provided an apparatus comprising: rewritable storage circuitry to store at least one mapping between at least one instruction identifier and a behaviour modification; selection circuitry to select, from said rewritable storage circuitry, a selected mapping having an instruction identifier that identifies a received instruction, wherein said received instruction causes a data processing unit to perform a default behaviour; and control circuitry to cause said data processing unit to behave in accordance with said default behaviour modified by said behaviour modification.

Viewed from a second example configuration, there is provided method of operating a data processing device comprising: storing, in rewritable storage circuitry, at least one mapping between at least one instruction identifier and a behaviour modification; receiving a received instruction, wherein said received instruction causes a data processing unit to perform a default behaviour; selecting, from said rewritable storage circuitry, a selected mapping having an instruction identifier that identifies said received instruction; and causing said data processing unit to behave in accordance with said default behaviour modified by said behaviour modification.

Viewed from a third example configuration, there is provided an apparatus comprising: rewritable storage circuitry to store at least one instruction identifier; selection circuitry to select, from said rewritable storage circuitry, a selected mapping having an instruction identifier that identifies a received instruction to be executed by a data processing unit; control circuitry to generate a signal, which identifies said selected mapping; and analysis circuitry to generate an output trace comprising operations performed by said data processing unit and to receive said signal and, in response to receiving said signal, to output said selected mapping to said trace.

BRIEF DESCRIPTION OF THE DRAWINGS

The present invention will be described further, by way of example only, with reference to embodiments thereof as illustrated in the accompanying drawings, in which:

FIG. 5C illustrates a mapping stored by rewritable storage circuitry in accordance with one embodiment;

FIG. 5D illustrates a mapping stored by rewritable storage circuitry in accordance with one embodiment;

DESCRIPTION OF EXAMPLE EMBODIMENTS

Figure 1:
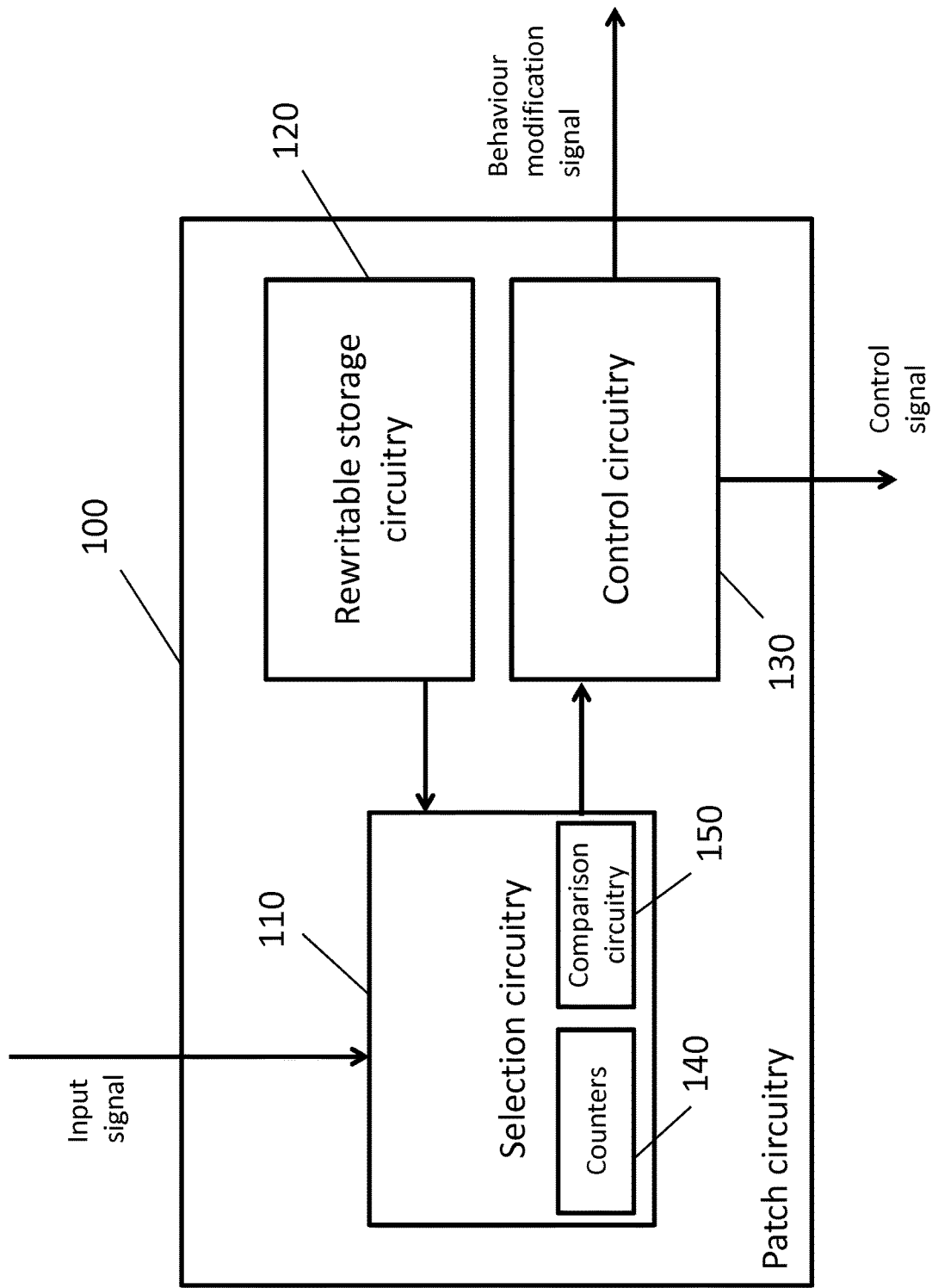
FIG. 1 schematically illustrates patch circuitry in accordance with one embodiment.

Before discussing the embodiments with reference to the accompanying figures, the following description of embodiments is provided.

Viewed from a first example configuration, there is provided an apparatus comprising: rewritable storage circuitry to store at least one mapping between at least one instruction identifier and a behaviour modification; selection circuitry to select, from said rewritable storage circuitry, a selected mapping having an instruction identifier that identifies a received instruction, wherein said received instruction causes a data processing unit to perform a default behaviour; and control circuitry to cause said data processing unit to behave in accordance with said default behaviour modified by said behaviour modification.

A Data Processing Unit (DPU) performs a particular default behaviour in response to an instruction. The rewritable storage circuitry is able to store a number of mappings between instruction identifiers and behaviour modifications. When a received instruction matches the instruction identifier in one of the mappings, the DPU is made, via the control circuitry to behave in accordance with the default behaviour modified by the behaviour modification. Since the rewritable storage circuitry is rewritable, it is possible to dynamically add, delete, and edit the mappings using software. Accordingly, the behaviour of the DPU in response to a given received instruction can be changed. Hence, if a fault is found with the execution of a particular instruction or sequence of instructions, then it is possible to make the DPU behave in a different manner to the default and thereby inhibit such a fault from occurring. It should be noted that the default behaviour modified by the behaviour modification can result in completely different behaviour to the default behaviour such that the default behaviour does not occur at all.

In some embodiments, said instruction identifier identifies a plurality of instructions. Such embodiments allow behaviour of the DPU to be modified on the basis of one or more classes of instruction or any instruction having particular characteristics.

There are a number of ways in which the instruction identifier can identify a plurality of instructions. However, in some embodiments, said instruction identifier comprises a base instruction and a mask; said received instruction is represented by a plurality of bits; and said mask indicates those bits of said received instruction that must match corresponding bits of said base instruction in order for said instruction identifier to identify said received instruction. Such a way of identifying a plurality of instructions is particularly efficient and allows a great deal of flexibility in controlling when a match occurs.

In some embodiments, said instruction identifier identifies at least one instruction comprising one or more operators. Instruction operators indicate the operation or task performed by a DPU. Examples of operations include performing an integer addition or multiplication, causing a branch to occur in the program flow, or performing a floating point operation. The instruction identifier can be used to identify one such operation type, a class of operations (an integer or floating point addition, for example) or all operations.

In some embodiments, said instruction identifier identifies at least one instruction comprising one or more operands. The operands are the individual elements on which the operation is performed. For example, in the addition operation 'ADD r2 2 3', which adds the values '2' and '3' together and stores the result in register r2, the operands are 'r2', '2' and '3'. An operand could be an absolute value, a register, or a memory addresses.

In some embodiments, said instruction identifier identifies at least one instruction that references one or more memory addresses. Memory addresses are often referenced when storing data to memory or retrieving data from memory—operations that can be performed by a load/store processing unit. Accessing memory can be particularly complicated due to handshaking protocols that must take place between the load/store unit and the memory device itself. Accordingly, it is not uncommon for faults to occur with respect to the loading or storing of data to/from the memory device.

In some embodiments, said at least one mapping further comprises a required state; and said selection circuitry selects said selected mapping in further dependence on said required state matching a current state of said data processing unit. In such embodiments, it is not only necessary for the instruction to match an identifier of a particular mapping, but it is also necessary for the DPU to have a current state that matches a required state. Where a mapping relates to a sequence of instructions, the required state can vary between instructions, can be the same for all instructions or can be specified for only the final instruction in the sequence.

In some embodiments, said required state comprises a requirement that said data processing unit is in one of 32-bit mode or 64-bit mode. The execution mode in which a DPU operates can have an effect on how that DPU works. Consequently, in some cases, it is desirable to affect the behaviour of the DPU for the execution of certain instructions when in a particular execution mode.

In some embodiments, said required state comprises a requirement that said data processing unit is operating in one of a more privileged level than a predetermined execution level or a less privileged level than said predetermined level. The DPU can often operate at different levels of privilege. For example, multiple pieces of user software each operate at a 'user' level of privilege and an operating system operates as a 'supervisor' or 'monitor' level of privilege. This makes it possible for the operating system to limit or control access to sensitive data or operations or to isolate the multiple pieces of user software from each other so that they cannot interfere with each other. In more complex arrangements, a hypervisor can execute at an even higher 'hypervisor' level of operation in order to allow multiple operating systems to operate on a device under the control and management of the hypervisor. Other or different levels are also possible.

In some embodiments, said required state comprises a requirement that said data processing unit has specified functionality enabled or disabled. For example, a Translation Lookaside Buffer (TLB) can be used to quickly translate between recently used virtual memory addresses and physical memory addresses. However, on some occasions, such functionality could be disabled by deactivating the TLB. The required state can refer to multiple different functions. For example, the required state can require that some functionality is enabled whilst other functionality is disabled.

In some embodiments, said required state comprises a requirement that said data processing unit is using a predetermined instruction set or an instruction set other than said predetermined instruction set. A DPU can often be made to switch between different instruction sets. Accordingly, the required state can require that a specific instruction set is being used by the DPU in order to modify behaviour caused by a particular instruction.

In some embodiments, said at least one mapping comprises a sequence of at least two instruction identifiers including said instruction identifier; and said selection circuitry is to select, from said rewritable storage circuitry, a selected mapping having a sequence of at least two instruction identifiers including said instruction identifier, wherein said at least two instruction identifiers identify a sequence of received instructions including said received instruction. Although, in an out of order implementation, the received instruction for which the behaviour is modified could be the first instruction in the sequence, the received instruction for which the behaviour is modified is typically at the end of the sequence of received instructions. Accordingly, the apparatus is able to control the behaviour of a received instruction when that received instruction is the first or last instruction in a sequence of instructions. It could be the case, for example, that an ADD instruction followed by a SUBTRACT instruction causes a fault to arise. The mapping can therefore include a sequence of instruction identifiers—the first one matching an ADD instruction and the second one matching the SUBTRACT instruction so that the behaviour of the SUBTRACT instruction in the sequence is modified to avoid the faulting behaviour.

In some embodiments, said apparatus comprises a pipeline comprising instruction fetch circuitry, instruction decode circuitry and at least one execution circuit; and said data processing unit comprises said instruction decode circuitry and said at least one execution circuit. The instruction fetch circuitry causes an instruction to be fetched from, for example, a memory. The instruction decode circuitry causes the fetched instruction to be decoded into one or more micro operations, which are then provided to the at least one execution circuit. The at least one execution circuit can include, for example Arithmetic Logic Units (ALUs), Floating Point Units (FPUs), Load/Store units, Branch units, and Multiply Accumulate units (MACs). Other examples will be apparent to the skilled person. In some embodiments, the instruction fetch circuitry sends a control signal to the selection circuitry as well as to the decode circuitry.

In some embodiments, in response to receiving said instruction, said instruction decode circuitry outputs a plurality of bits corresponding to one or more micro-operations to be performed by said at least one execution circuit; said behaviour modification indicates a set of said plurality of bits to be modified. The total bits output by the decode circuitry can be referred to as an output plane and can comprise a large number of bits, which are sent to one or more execution circuits. By modifying some of these bits, it is possible to change the behaviour of the DPU as a consequence of executing a particular instruction.

The set can be a completely new set of bits. This can cause an execution circuit to perform completely different behaviour than the default behaviour. However, in other embodiments, said set is a subset. In other words, the behaviour can be modified slightly—for example, by always using register r3 rather than register r2 if it is known that register r2 has become unreliable. In some embodiments, said set consists of a single bit. Such a bit can be used to encode special behaviour. For example, a single bit can be used to signify that a particular instruction is not to be executed out-of-order.

There are numerous examples of the default behaviour modified by the behaviour modification. However, in some embodiments, said default behaviour modified by said behaviour modification comprises causing said data processing unit to flush said pipeline. The pipeline can enable multiple instructions to be handled substantially simultaneously. In effect, while one instruction is being executed by an execution circuit, the next instruction is being decoded by the instruction decode circuitry and the instruction after that is being fetched by the instruction fetch circuitry. Flushing the pipeline causes all instructions being handled to be discarded. This has the effect of "resetting" the state of the pipeline.

In some embodiments, said default behaviour modified by said behaviour modification comprises causing said data processing unit to enable or disable prefetching of data. The prefetching of data makes it possible for data to be fetched, e.g. from memory, before it is needed, in anticipation of its near-future use. Disabling the prefetching of data can be achieved, for example, by converting any prefetch instruction to a NOOP instruction, which is a special instruction that merely causes the program counter to increment. In effect, prefetching can therefore be disabled.

In some embodiments, said default behaviour modified by said behaviour modification comprises causing said data processing unit to change a number of instructions issued in one clock cycle. An example of this is triple-issuing, in which three instructions can be issued to execution circuits simultaneously. In some embodiments, therefore, triple issuing can be reduced to dual issuing or multi-issuing can be disabled altogether, thereby reducing the number of instructions issued in one clock cycle to 1.

In some embodiments, said default behaviour modified by said behaviour modification comprises causing said data processing unit to enable or disable out-of-order execution. Out-of-order execution makes it possible for instructions to be re-ordered in order to improve parallelisation. For example, if only a single floating point circuit is present, then only one floating point operation can be handled at once. Two floating point instructions in a sequence could therefore be re-ordered so that the instructions are interspersed by other instructions that can be executed while the first floating point instruction is being executed.

In some embodiments, said default behaviour modified by said behaviour modification comprises generation of a signal, which identifies said selected mapping. The signal can therefore be used to determine that an instruction (or sequence of instructions) was encountered. Such information can be beneficial when performing debugging or gathering statistics (e.g. for performance analysis).

In some embodiments, said apparatus comprises an Embedded Logic Analyser to receive said signal. An Embedded Logic Analyser (ELA) can be made to receive input signals from different circuits within an apparatus when particular events occur. For example, an ELA can receive a signal from an ALU whenever the ALU receives an instruction to perform a particular operation. By additionally providing information to an ELA regarding when an instruction or sequence of instructions was encountered, it is possible to perform more detailed analysis on the behaviour of the apparatus.

Particular embodiments will now be described with reference to the figures.

FIG. 1 illustrates patch circuitry 100 in accordance with one embodiment. The patch circuitry 100 comprises selection circuitry 110, which receives an input signal corresponding to a received instruction. In this embodiment, the input signal is produced by instruction fetch circuitry and corresponds with the same signal sent to instruction decode circuitry as part of a pipeline. The selection circuitry 110 consults rewritable storage circuitry 120, which stores a table of mappings between instruction identifiers and behaviour modifications. A comparison is made by comparison circuitry 150 and if a match is found then the resulting behaviour modification is provided to the control circuitry, which outputs a behaviour modification signal (e.g. a "patch"). The control circuitry 130 additionally outputs a control signal, which is used to control the insertion of the behaviour modification. This process is shown in more detail in FIGS. 2-4, which show the DPU. Each entry in the rewritable storage circuitry 120 relates to a specific instruction, a class of instructions, or a sequence of either. For each mapping that maps a sequence of instructions, it is necessary to provide a counter to keep track of how much of each sequence has been matched so far. Each counter is stored in a group of counters 140 in the selection circuitry 110.

Figure 2:
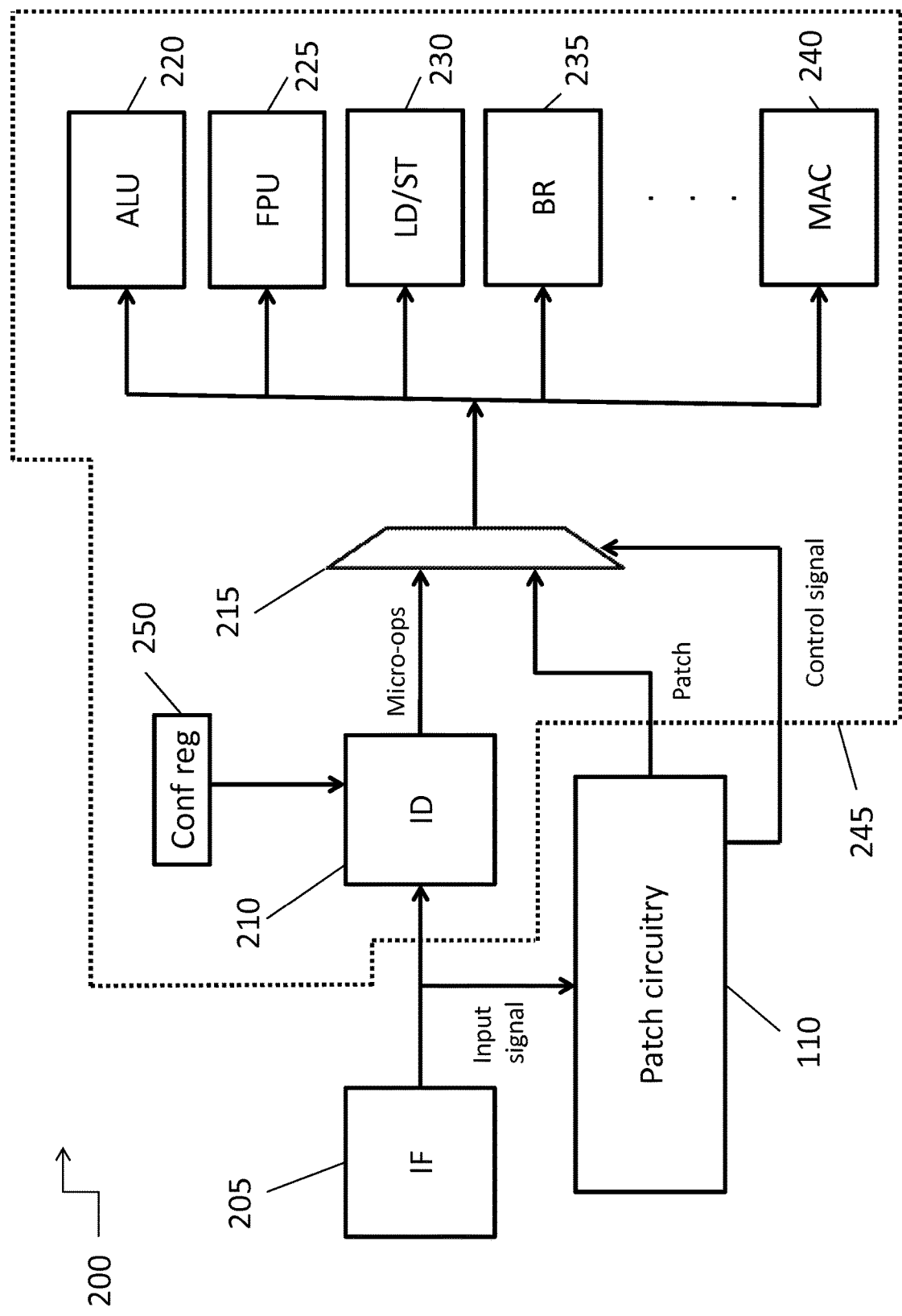
FIG. 2 schematically illustrates a DPU and patch circuitry in accordance with an embodiment.

FIG. 2 illustrates a system 200 comprising a DPU 280. In this example, the DPU comprises those parts of the system 200 that are responsible for actually performing an instruction and specifically includes an instruction decoder 220 and a plurality of execution circuits 220, 225, 230, 235, 240. Instruction fetch circuitry 205 and instruction decode circuitry 210, together with the execution circuits 220, 225, 230, 235, 240 collectively form a pipeline. Within the pipeline, an instruction is fetched by the instruction fetch circuitry 205. This causes an input signal to be provided to the instruction decode circuitry 210 as well as the patch circuitry 110. The instruction decode circuitry 210 decodes the instruction, and this results in a plurality of bits being output by the instruction decode circuitry 210 in the form of one or more micro-operations. These are multiplexed together at a multiplexer 215 with a patch (e.g. modified micro-operations) that is output by the patch circuitry 110. The control signal output by the patch circuitry 110 is used to control the multiplexer. Accordingly, it is possible to cause either the entire set of bits making up all the micro-operations output by the instruction decode circuitry 210, or only a subset of the bits, or even on a single bit, to be modified. The output of the multiplexer 215 corresponds with the default behaviour modified by the behaviour modification and the resulting modified micro-operations are then transmitted to the relevant execution circuit 220, 225, 230, 235, 240. In this embodiment, the execution circuits include an Arithmetic Logic Unit (ALU) 220, which performs integer arithmetic or logical operations, a Floating Point Unit (FPU) 225, which performs operations on floating point numbers, a load/store unit 230, which handles loading and storing data to/from a memory, a branch unit 235, which handles branching and the control of program flow, and a Multiply Accumulate unit 240, which handles the special arithmetic case of multiplying numbers and adding the result to an accumulator. These are, however, merely examples of execution circuits. In particular, any combination of these or other execution circuits can be used. The combination of execution circuits can also vary. In some cases, multiple execution circuits of the same type can also be included. In this embodiment, a set of configuration registers 250 are included. These control the way in which the DPU 245 operates. In some embodiments, the configuration registers 250 can be used to enable or disable functionality such as pre-fetching. In some cases, these can be used to disable functionality that is experimental. In any event, the instruction decode circuitry 210 issues micro-operations in dependence on the received instruction in view of the value of the configuration registers 250. The patch circuitry 110 can provide a patch that overrides the configuration registers. For example, if the micro-operations produced by the instruction decode circuitry 210 contain an indication that an experimental prefetching mechanism should be used, then the patch circuitry can issue a replacement set of bits for part of the micro-operations as a "patch" to disable the experimental mechanism in a situation in which it is known that the mechanism does not work.

Figure 3:
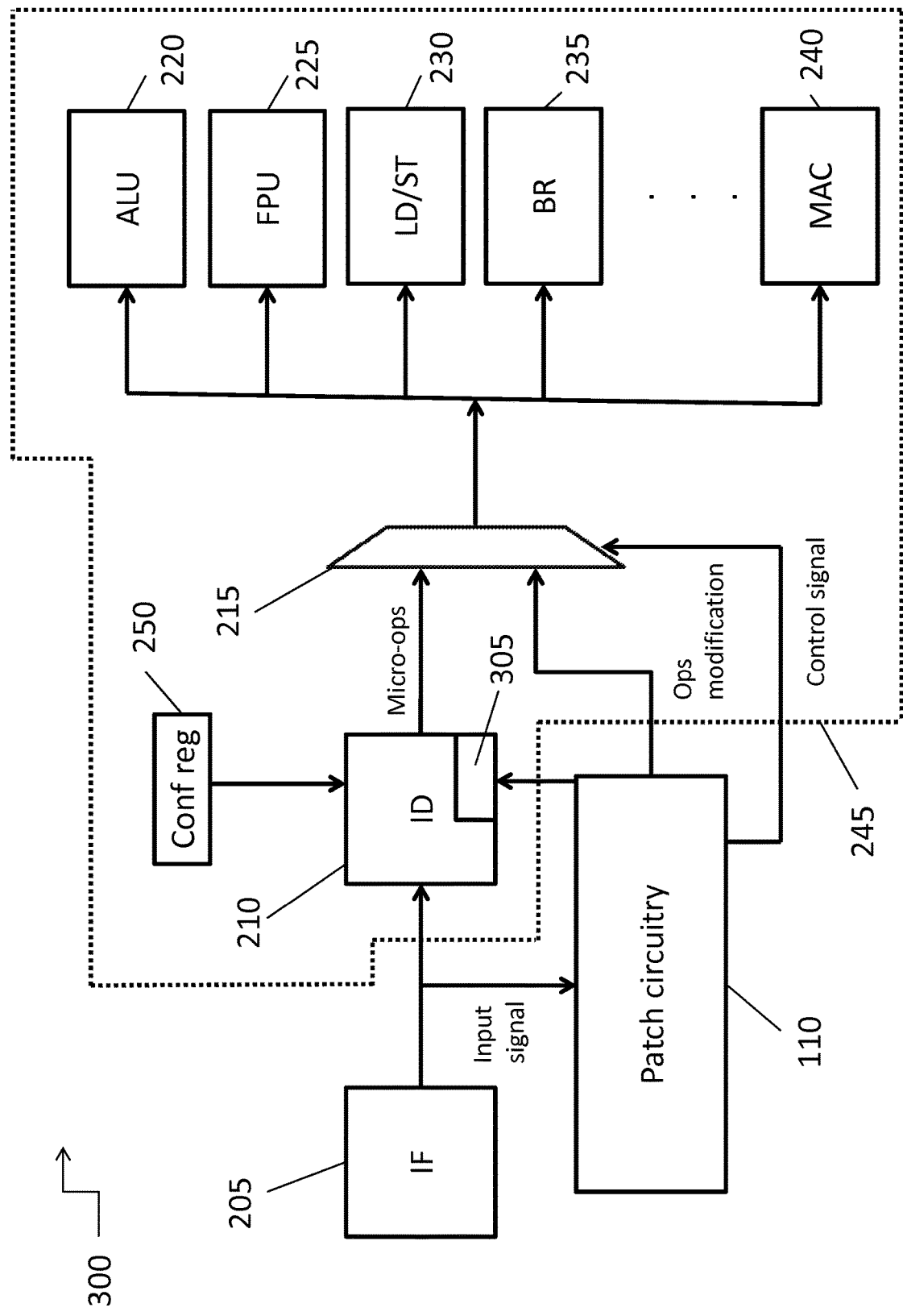
FIG. 3 schematically illustrates a DPU and patch circuitry in accordance with an embodiment.

FIG. 3 illustrates a system 300 that is similar to the system 200 shown in FIG. 2 except that the patch circuitry 110 is able to output a signal to multi-issue circuitry 305 in the instruction decode circuitry 210. The multi-issue circuitry 305 controls the ability of the DPU 245 to perform multi-issue (for example dual-issue) of instructions. This relates to the process in which multiple instructions (e.g. two instructions in the case of dual-issuing) are issued within a single clock cycle. In some embodiments, where the behaviour modification involves disabling or enabling multi-issue, it is unnecessary to provide a "patch" or any modified bits to the multiplexer 215.

Figure 4:
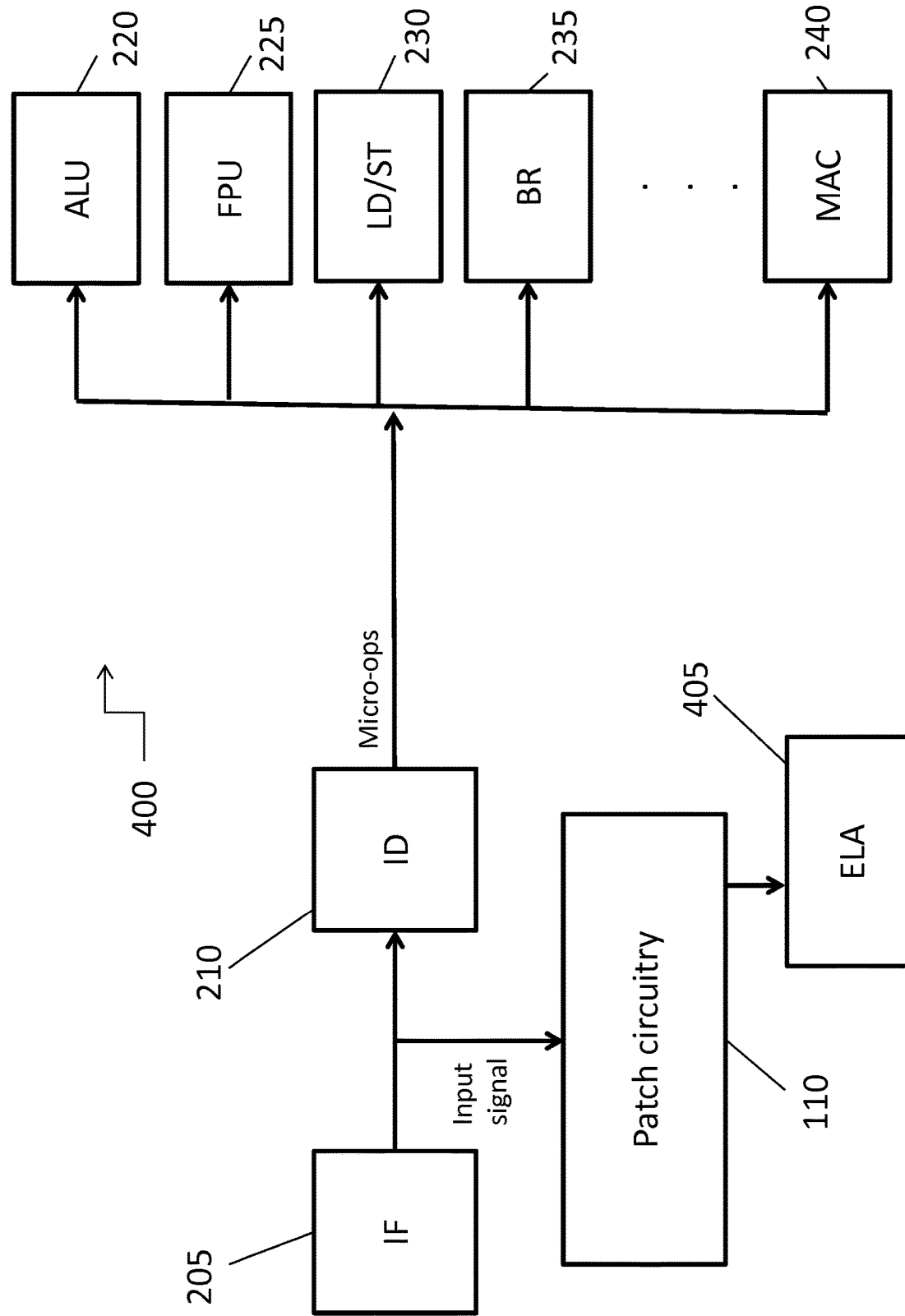
FIG. 4 schematically illustrates a DPU and patch circuitry in accordance with an embodiment.

FIG. 4 illustrates a system 400 in which the behaviour modification signal output by the patch circuitry 110 takes the form of a signal to an Embedded Logic Analyser (ELA) 405, which is another example of a DPU. The behaviour modification signal indicates which of the mappings stored in the rewritable storage circuitry 120 has been matched with the received instruction. For example, the behaviour modification signal could comprise an index of the mapping. The ELA receives inputs from different circuits within the system 400, including those of the execution circuits 220, 225, 230, 235, 240. The ELA outputs a trace based on the signals that it receives. For example, in response to the ALU 220 performing an ADD operation, a signal is transmitted to the ELA 405, which outputs this information to a trace. In addition, however, the signal received by the ELA 405 from the patch circuitry 110 also causes output to be written to the trace. This can make it easier to perform debugging or statistical analysis by viewing the trace with additional information relating to whether particular instructions or sequences of instructions that were fetched by the instruction fetch circuitry 205 were matched.

Figures 5A, 5B:
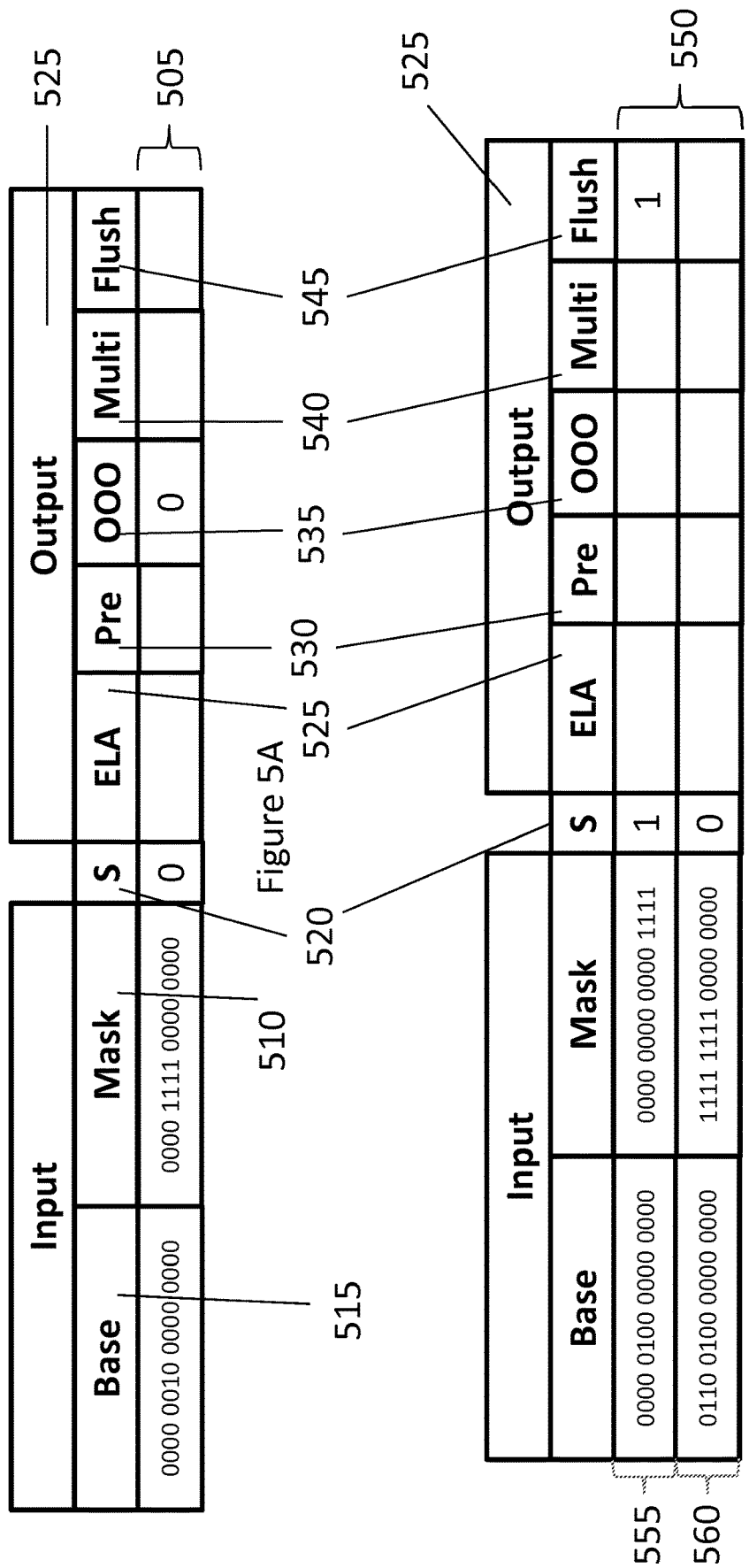
FIG. 5A illustrates a mapping stored by rewritable storage circuitry in accordance with one embodiment.
FIG. 5B illustrates a mapping stored by rewritable storage circuitry in accordance with one embodiment.

FIG. 5A illustrates an example of a mapping 505 stored by the rewritable storage circuitry 120 in accordance with one embodiment. A received instruction is matched against an instruction identifier in each mapping until a match is found, or until it is determined that there is no match. Each mapping comprises at least one instruction identifier, each comprising a base instruction 515 and a mask 510. The mask 510 indicates which bits of the base instruction 515 are to be mapped against corresponding bits of the received instruction. In this embodiment, the presence of a '1' in bit position i of the mask 510 indicates that the bit in bit position i of the base instruction 515 must match the bit in bit position i of the received instruction. In the example shown in FIG. 5A, therefore, a match will occur if the received instruction has any four bits, followed by the bits '0010', followed by any further eight bits. In this case, therefore, the instruction identifier will match against a large class of instructions. In contrast, when the mask is mostly full of 1s then only a very specific instruction will cause a match. A flag 'S' 520 is used to indicate whether or not this instruction identifier is part of a sequence of instruction identifiers in the mapping 505. In this case, the value '0' for the mapping 505 indicates that it is not. Accordingly, if the received instruction matches the single instruction identifier in this mapping 505, then the behaviour modification listed under the output section 525 occurs. Each column 530, 535, 540, 545 in the output section 525 indicates a different behaviour modification that can take place when a particular mapping is matched. The ELA column 525 is used to indicate whether or not a signal should be output to, for example, an ELA 405 as previously discussed with reference to FIG. 4. The signal includes an indication of the entry that was matched. In this example, the signal indicates the value '0' to indicate that mapping number 0 was matched. The pre column 530 indicates whether or not the prefetching of instructions should be enabled or disabled. Prefetching can be disabled by, for example, converting all implicit memory access instructions to NOOP instructions, which merely increment the program counter of the DPU. The OOO column 535 indicates whether out of order instruction execution should be disabled or enabled. In this example, an entry of '0' indicates that out of order instruction execution should be disabled, in other words, that the ordering of this instruction should not be changeable. The Multi column 540 indicates the number of instructions that can be issued in parallel with this instruction. A value of '1' here would mean that the instruction can only be issued on its own. In other words, this instruction cannot be multi-issued (such as dual-issued) with any other instruction. Any value provided here is, of course, dependent on support from the underlying hardware. For example, if only a single ALU is provided then arithmetic or logical integer instructions can only be single issued, regardless of the value provided here. The Flush column 545 indicates that the pipeline is to be flushed once the instruction has been executed. Other behaviour modifications are also possible. Furthermore, a single mapping can provide multiple modifications. For example, a single mapping can cause the pipeline to be flushed and for the instruction's ordering to remain unchanged by setting a '0' in the OOO column 535 and a '1' in the Flush column 545 for that single entry.

FIG. 5B illustrates an example in which there is a single mapping 550 comprising a sequence of instruction identifiers 555, 560. In this case, the single mapping 550 will be matched if a first received instruction matches the first instruction identifier 555 and the following instruction matches the second instruction identifier 560. The value '1' in the S column 520 for the first instruction identifier is used to indicate that, having matched the first instruction identifier 555, the next instruction identifier 560 must also match for the overall mapping 550 itself to be matched. In this example, the first instruction must comprise 12 bits, followed by the bits '1111'. The subsequent instruction must comprise the bits '0110 0100' followed by another 8 bits. If all of these conditions are met, then the output columns indicate that the pipeline is to be flushed after the instructions are executed. Each mapping that requires multiple instructions to be matched uses a counter in the set of counters 140 to track how much of the sequence of instruction identifiers has been matched so far. If, at any stage, the current instruction does not match the next instruction identifier, then the counter is reset and the matching must begin again.

As previously explained, many of the behaviour modifications have defaults set in a configuration register 250. The values set in the configuration register 250 affect the micro-operations output by the instruction decode circuitry 210. Some of the behaviour modifications (pre, OOO, and flush) provided in the tables shown in FIG. 5A and FIG. 5B cause a changed set of micro-operations to be output by the patch circuitry 110. These changes are often represented by a very small number of bits (often even a single bit). For example, if the micro-operations for an ADD instruction comprise 140 bits, the $50^{th}$ bit could control whether or not out of order execution is permitted or not. If it is known which bit must be changed then, rather than re-outputting the entire set of modified micro-operations, it is possible to output a much smaller 'patch'. This patch can be applied to the micro-operations produced by the instruction decode circuitry 210 via a multiplexer 215, which is controlled by the patch circuitry 110. This results in a modified set of micro-operations being produced very efficiently. Multi-issue is enabled or disabled by issuing a signal to multi issue circuitry 305 in the instruction decode circuitry 210. The use of the ELA 405 is enabled or disabled by simply providing a signal to the ELA 405.

FIG. 5C illustrates an example in which different output columns 565 are provided for the behaviour modification of a mapping. New bits column 570 indicates a new set of bits to be multiplexed with the bits that represent the micro-operations produced by the instruction decode circuitry 210. The start column 575 indicates the point at which these bits are to be multiplexed with the bits that represent the micro-operations produced by the instruction decode circuitry 210. The length column 580 indicates the length of the replacement bits. In this example, a T column 585 is also provided. This column indicates whether subsequent instructions are to be modified. Subsequent output lines are then provided to indicate how those instructions are modified. For example, the mapping shown in FIG. 5C indicates that, if a match is made with the received instruction, then bits 11-18 of the bits used to represent the micro-operations produced by the instruction decode circuitry 210 are to be modified to '0010 1110'. Furthermore, bits 216-219 of the bits of the micro-operations produced by the instruction decode circuitry 210 for the subsequent instruction are to be modified to '0110'. The output columns 565 therefore collectively explicitly indicate how the micro-operations produced by the instruction decode circuitry 210 are to be modified by means of the multiplexer 215.

FIG. 5D illustrates an example having still further different output columns 565. In the case of FIG. 5D, each mapping has a set of replacement bits 595 and a mask 590 indicating which bits should be replaced and which bits should be kept from the bits that make up the micro-operations output by the instruction decode circuitry 210. In this example, a '1' in the mask 590 at a bit position j indicates that the bit at position j of the micro-operations produced by the instruction decode circuitry 210 should be replaced with the corresponding bit at position j of the replacement bits 595. A '0' at position j indicates that no replacement should be made for the bit at position j. For example, in the example of FIG. 5D, the first four bits of the micro-operations will be replaced with '1111', the next four bits will be unmodified, the following four bits will be replaced with '1110' and the next four bits will be replaced with '0011'. This process allows for extremely complicated modifications to be made to the micro-operations.

Each of the examples described in FIGS. 5A-5D can be combined such that some mappings use the technique described in FIG. 5A and others use the techniques described in FIG. 5B, 5C, or 5D. One way to implement this would be to have a primary table providing the instruction identifier along with an index and an indication of which secondary table to use. A different secondary table can then be provided for each of the four different techniques.

The use of the 'T' column described in FIG. 5C can also be extended to any of the techniques described in column 5A, 5B, or 5D.

Figure 5E:
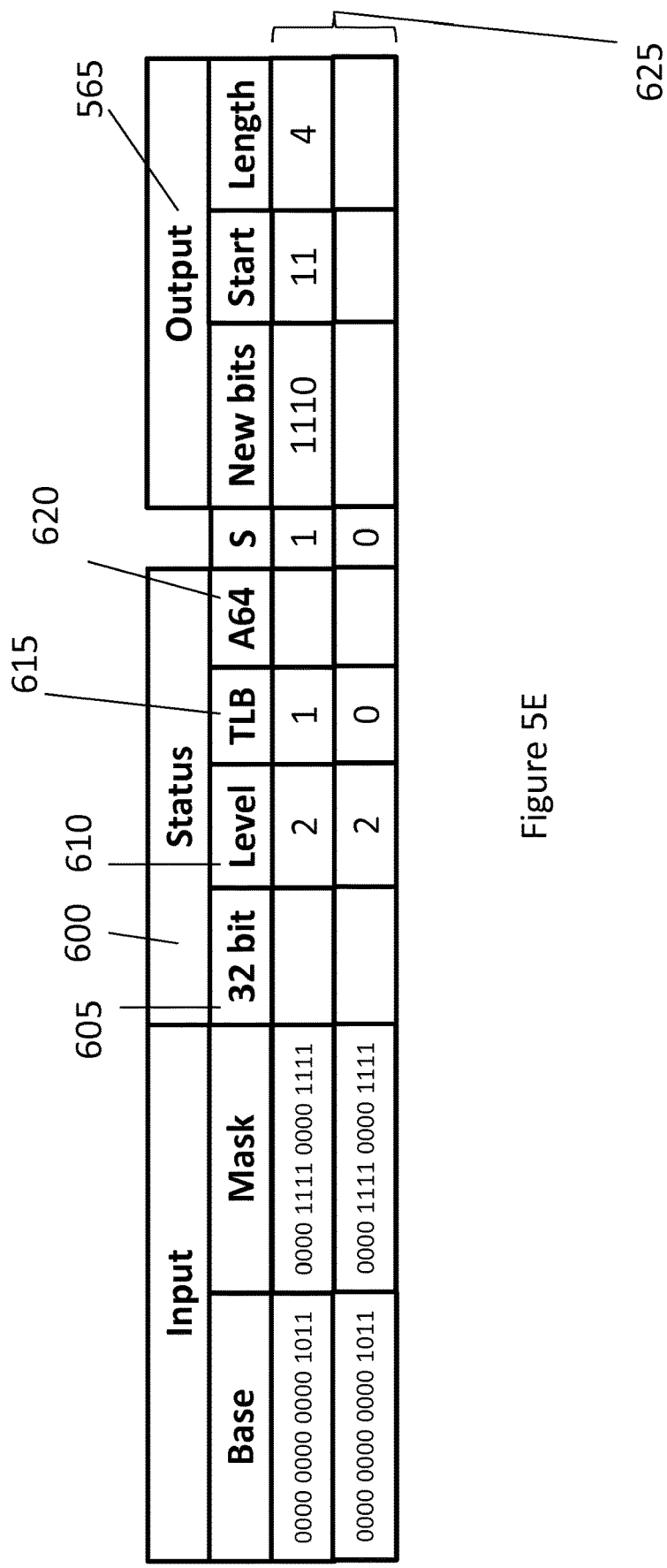
FIG. 5E illustrates a mapping stored by rewritable storage circuitry in accordance with one embodiment.

FIG. 5E illustrates a further consideration that may be made when determining whether or not a received instruction matches an instruction identifier in a mapping. Although FIG. 5E shows this further consideration being used in combination with the technique shown in FIG. 5C, it may be used with any of the techniques described with reference to FIGS. 5A-5D. In FIG. 5E, a further set of status columns 600 are added. In such embodiments, an instruction identifier matches the received instruction if two conditions are met. Firstly, the received instruction must correspond with the base instruction and the mask as previously described and secondly, a status of the DPU must also match the status defined by the status columns 600. In this example, the status columns 600 comprise a 32-bit column 605 that indicates whether or not the DPU is currently executing in 32-bit mode. A level column 610 indicates a current execution level of the DPU. In other words, the level column 610 indicates a current level of privilege in which the DPU is currently executing. A hypervisor could execute in a higher level of privilege than an operating system, which could execute in a higher level of privilege than a user application, for example. The status columns can also be used to indicate whether a particular aspect of functionality is enabled or disabled. For example, TLB column 615 is used to indicate whether or not a Translation Lookaside Buffer (TLB) is currently active or not. A further column A64 620 is used to determine whether the instruction set currently being executed is A64 or not. However, this column could also be modified to indicate which, of several instruction sets is currently being executed by the DPU. For example, the value '0' could represent A64, the value '1' could represent 'A32', the value '2' could represent 'T32', and the value '3' could represent 'D16'. In this example, a match occurs with the single mapping 625 shown in FIG. 5E if a first instruction has four bits, followed by the bits '0000', followed by another four bits, followed by the bits '1011' and if, at the time the first instruction is received, the execution level is '2' and the TLB is enabled and if the next received instruction has four bits, followed by the bits '0000', followed by another four bits, followed by the bits '1011' and if, at the time that next instruction is received, the execution level is '2' and the TLB is disabled. If all of these conditions are met, then the behaviour modification indicated by the output columns 565 occurs. Note that, in this embodiment, a different required status of the DPU can be provided for each instruction identifier. This allows a great deal of flexibility in matching. However, in other embodiments, there is a single required status and this must correspond with the status of the DPU when every instruction in a sequence is received. In still other embodiments, the status of the DPU is only considered when the final instruction in the sequence is compared to a final instruction identifier in the mapping.

Figure 6:
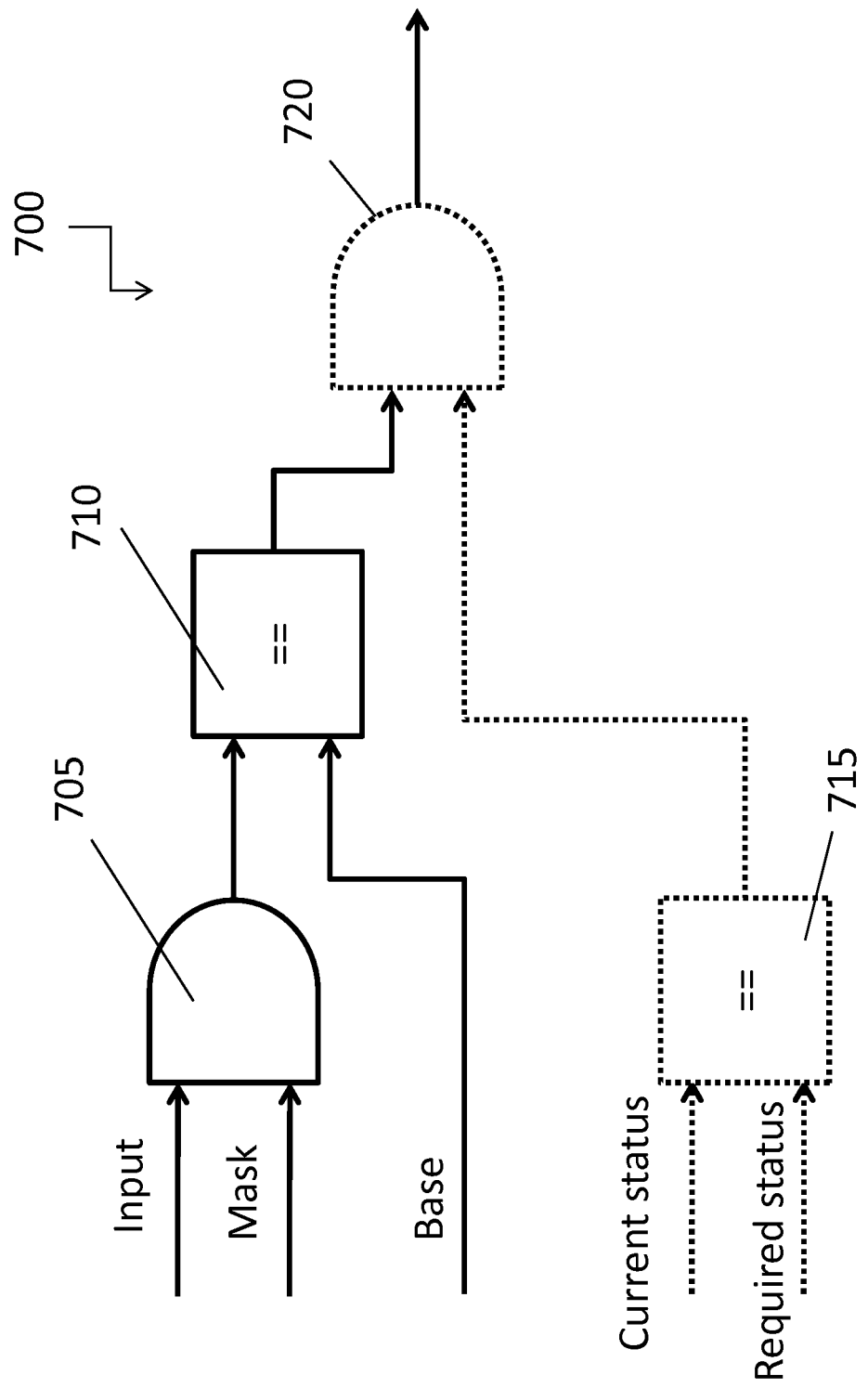
FIG. 6 illustrates an example of comparison circuitry for determining whether an instruction identifier in a particular mapping corresponds with a received instruction.

FIG. 6 schematically illustrates circuitry 700 that can be used to indicate whether a particular mapping matches a received input instruction. The circuitry comprises a first AND gate 705 that performs a logical AND between the input instruction and the mask 515. The logical function AND returns a '1' where the two inputs are '1' and a '0' otherwise. The output of the AND gate is therefore a set of bits corresponding to the logical AND between the input instruction and the mask. A first equality circuit 710 returns a single bit '1' if two sets of bits match each other and returns a single bit '0' otherwise. In embodiments where the status of the DPU is not considered, the output of the first equality circuit 710 then corresponds with whether a match is made (if the output is '1') or not (if the output is '0'). In embodiments where the status of the DPU is considered, a second equality circuit 715 is used to compare the specified status columns against the status of the DPU. Where no entry is made in a particular status column, no comparison is made. The result of the second equality circuit 715 and the first equality circuit 710 are then provided to a second AND gate 720. The output of the second AND gate 720 then corresponds with whether a match is made (if the output is '1') or not (if the output is '0'). The second AND gate 720 requires that a match is made against both the instruction identifier and the required status of the DPU.

Figure 7:
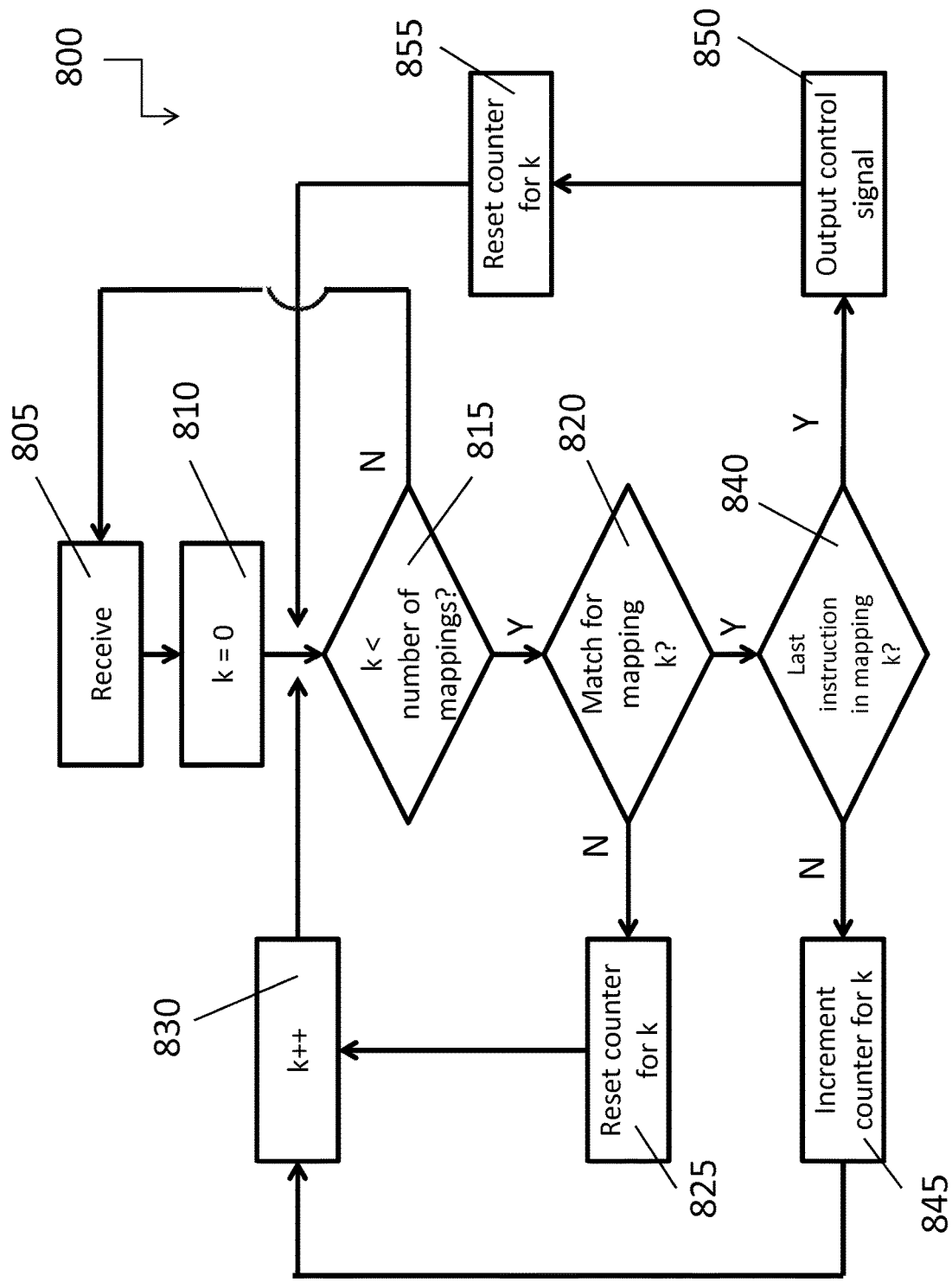
FIG. 7 illustrates, in flow chart form, a method for determining any behaviour modification to take place based on a received instruction.

FIG. 7 shows a flowchart 800 that illustrates the way in which a received instruction can be matched against mappings in the rewritable storage circuitry 120. The process begins at step 805 where an instruction is received. At step 810, the counter k, which represents which mapping is currently being considered, is set to 0. At step 815, it is determined whether or not the counter k is less than the number of mappings. If not, then the entire set of mappings has been considered and no match found, in which case the process returns to step 805 where the next instruction is received. Otherwise, the process continues to step 820 where it is determined whether mapping k matches or not. This includes comparing the received instruction against the instruction identifier of the current mapping k indicated by the counter for entry k as well as comparing the system status to any required status corresponding with this instruction identifier in mapping k. For example, if the counter for entry k is '2' then the third instruction identifier and the corresponding status for that instruction identifier are compared to the received instruction and the status of the DPU. If there is no match (i.e. if either the instruction or the status do not match), then any counter associated with mapping k is reset at step 825. This represents the fact that if mapping k relates to a sequence of instructions/conditions then the sequence has been broken by a non-matching instruction/condition. The value of k is then incremented at step 830 and the process returns to step 815 to check the next mapping. Otherwise, at step 840, it is determined whether or not this is the last instruction in mapping k. For example, this might test whether the value of the S column (as discussed with reference to the embodiments shown in FIGS. 5A-5E) is 0. If not, then the counter associated with k is incremented at step 845, the counter k is incremented at step 830 and the process returns to step 815. This represents the situation in which further instructions must be matched before the overall mapping is matched. If it is determined that this is the last instruction at step 840, then at step 850 the corresponding control signal is output in order to effect the behaviour modification and at step 855 the counter for k is reset.

Note that if multiple matchings occur as a result of the same received instruction then the behaviour of the system is undefined. In particular, this can result in multiple modifications being made simultaneously, which could result in unpredictable behaviour. This can be prevented by, for example, only implementing the behaviour modification of the first mapping that matches.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
   rewritable storage circuitry to store at least one mapping between at least one instruction identifier and behaviour modification bits;
   selection circuitry to select, from said rewritable storage circuitry, a selected mapping having an instruction identifier that identifies a received instruction;
   instruction decode circuitry, to output a plurality of bits corresponding to one or more micro-operations that cause a default behaviour of said received instruction when the plurality of bits are executed by at least one execution circuit; and
   control circuitry to cause, in response to said selected mapping having the instruction identifier that identifies the received instruction, said at least one execution circuit to behave in accordance with said default behaviour modified by said behaviour modification bits, wherein
   the control circuitry is adapted to cause, in response to each of the at least one instruction identifier of each of the at least one mapping identifying an instruction other than the received instruction, said at least one execution circuit to behave in accordance with said default behaviour;
   the behaviour modification bits indicate only a subset of the plurality of bits to be modified; and
   the subset does not include all of the plurality of bits.

2. An apparatus according to claim 1, wherein
said instruction identifier identifies a plurality of instructions.

3. An apparatus according to claim 2, wherein
said instruction identifier comprises a base instruction and a mask;
said received instruction is represented by a plurality of bits; and
said mask indicates those bits of said received instruction that must match corresponding bits of said base instruction in order for said instruction identifier to identify said received instruction.

4. An apparatus according to claim 1, wherein
said instruction identifier identifies at least one instruction comprising one or more operators.

5. An apparatus according to claim 1, wherein
said instruction identifier identifies at least one instruction comprising one or more operands.

6. An apparatus according to claim 1, wherein
said instruction identifier identifies at least one instruction that references one or more memory addresses.

7. An apparatus according to claim 1, wherein
said at least one mapping further comprises a required state; and
said selection circuitry selects said selected mapping in further dependence on said required state matching a current state of said apparatus.

8. An apparatus according to claim 7, wherein
said required state comprises one or more requirements that said apparatus: is in 32-bit mode, is in 64-bit mode, is in a more privileged level than a predetermined execution level, is in a less privileged level than said predetermined execution level, has specified functionality enabled or disabled, is using a predetermined instruction set, and is using an instruction set other than said predetermined instruction set.

9. An apparatus according to claim 1, wherein
said at least one mapping comprises a sequence of at least two instruction identifiers including said instruction identifier; and
said selection circuitry is to select, from said rewritable storage circuitry, a selected mapping having said sequence of at least two instruction identifiers including said instruction identifier, wherein said at least two instruction identifiers identify a sequence of received instructions including said received instruction.

10. An apparatus according to claim 1, wherein
said apparatus comprises a pipeline comprising instruction fetch circuitry, said instruction decode circuitry and said at least one execution circuit.

11. An apparatus according to claim 10, wherein
said default behaviour modified by said behaviour modification bits comprises causing said apparatus to flush said pipeline.

12. An apparatus according to claim 1, wherein
said default behaviour modified by said behaviour modification bits comprises causing said data processing unit to enable or disable prefetching of data.

13. An apparatus according to claim 1, wherein
said default behaviour modified by said behaviour modification bits comprises causing said apparatus to change a number of instructions issued in one clock cycle.

14. An apparatus according to claim 1, wherein
said default behaviour modified by said behaviour modification bits comprises causing said apparatus to enable or disable out-of-order execution.

15. An apparatus according to claim 1, wherein
said default behaviour modified by said behaviour modification bits comprises generation of a signal, which identifies said selected mapping.

16. An apparatus according to claim 15, wherein
said apparatus comprises an Embedded Logic Analyser to receive said signal.

17. A method of operating an apparatus comprising:
storing, in rewritable storage circuitry, at least one mapping between at least one instruction identifier and behaviour modification bits;
receiving an instruction as a received instruction;
selecting, from said rewritable storage circuitry, a selected mapping having an instruction identifier that identifies said received instruction;
outputting a plurality of bits corresponding to one or more micro-operations that cause a default behavior when the plurality of bits are executed by at least one execution circuit;
causing, in response to said selected mapping having the instruction identifier that identifies the received instruction, said at least one execution circuit to behave in accordance with said default behaviour modified by said behaviour modification bits; and
causing, in response to each of the at least one instruction identifier of each of the at least one mapping identifying an instruction other than the received instruction, said at least one execution circuit to behave in accordance with said default behaviour, wherein
the behaviour modification bits indicate only a subset of the plurality of bits to be modified; and
the subset does not include all of the plurality of bits.

18. An apparatus comprising:
rewritable storage circuitry to store at least one instruction identifier;
selection circuitry to select, from said rewritable storage circuitry, a selected mapping having an instruction identifier that identifies a received instruction to be executed by a data processing unit and behavior modification bits;
control circuitry to generate a signal, which identifies said selected mapping; and
analysis circuitry to generate an output trace comprising operations performed by said data processing unit when said received instruction is received, and to receive said signal and, in response to receiving said signal, to output said selected mapping to said output trace, wherein
the instruction identifier is associated with a plurality of bits corresponding to one or more micro-operations that cause a default behavior when the plurality of bits are executed by at least one execution circuit;
the behaviour modification bits indicate only a subset of the plurality of bits to be modified; and
the subset does not include all of the plurality of bits.

* * * * *